United States Patent [19]

Freissmuth

[11] 4,242,126
[45] Dec. 30, 1980

[54] PROCESS FOR THE TREATMENT OF IRON MELTS AND FOR INCREASING THE SCRAP PORTION IN THE CONVERTER

[75] Inventor: Alfred Freissmuth, Trostberg, Fed. Rep. of Germany

[73] Assignee: SKW Trostberg Aktiengesellschaft, Trostberg, Fed. Rep. of Germany

[21] Appl. No.: 56,734

[22] Filed: Jul. 11, 1979

[51] Int. Cl.³ .................................................. C21C 7/00
[52] U.S. Cl. ............................................. 75/51; 75/52; 75/53; 75/58; 75/60
[58] Field of Search .................... 75/53, 58, 51, 60, 52

[56] References Cited

U.S. PATENT DOCUMENTS

| | | | |
|---|---|---|---|
| 3,556,773 | 1/1971 | Grenfell | 75/52 |
| 3,771,998 | 11/1973 | Knuppel | 75/52 |
| 3,876,421 | 4/1975 | Takemura | 75/51 |
| 3,929,464 | 12/1975 | Todd | 75/58 |
| 3,998,625 | 12/1976 | Koros | 75/58 |
| 4,078,915 | 3/1978 | Meichsner | 75/58 |

*Primary Examiner*—P. D. Rosenberg
*Attorney, Agent, or Firm*—Toren, McGeady and Stanger

[57] ABSTRACT

A method for treatment of iron melts by blowing in oxygen or an oxygen containing gas with calcium carbide on top or into the iron melt. Using the process, the amount of iron scrap added to the melt can be increased, foaming is avoided and the temperature of the melt can be controlled.

14 Claims, No Drawings

PROCESS FOR THE TREATMENT OF IRON MELTS AND FOR INCREASING THE SCRAP PORTION IN THE CONVERTER

BACKGROUND OF THE INVENTION

1. Field of the Invention

The invention relates to a process for the treatment of iron melts with a simultaneous increase of the scrap portion in the converter.

2. Description of the Prior Art

The treatment of iron melts by the addition of 25 to 30% by weight of scrap to the pig iron in the converter is known. The combustion heat from the oxidation of the carbon, manganese, silicon and other melts in the pig iron is sufficient to melt down a certain addition of scrap and to increase the temperature to a level which is required for steel melts.

However, in certain cases, it is desirable to increase the scrap portion to make the steel production capacity more flexible so that it can be adjusted to the prevailing market and production conditions. More particularly, it should be possible to process the scrap, which is available in excess and is more economical compared to pig iron.

Moreover, it is desirable to make the operation of the top-blowing oxygen converter less dependent on the pig iron supply, i.e., the effects of problems in the blast furnace operation on the steel production should be reduced.

The conventional oxygen injection technique allows an increase of the temperature of the bath in the converter only within very narrow limits. In addition, this measure results in high specific costs, since increased iron losses occur during after-blowing. Therefore, many attempts to improve the heat balance in the converter so that the addition of increased portions of scrap is possible.

Increasing the scrap portion by mixing of oxygen with fuel gas in special burners and, thus, increasing the heat balance of the converter is known. It is also known to melt down metals, such as, mixtures of scrap and pig iron, by means of a flame lance which is fed with hydrocarbons, wherein powdered solids, such as carbide, are introduced into the flame in order to improve the heat transfer (Austrian Pat. No. 313,942).

All these known processes have a common step in that, another fuel, possibly charged with an oxidizable solid, is added or supplied separately by means of a special nozzle to the oxygen jet after emerging from the lance.

It has also been suggested to add calcium carbide in lumps or pieces to the melt during the blowing procedure to simplify the process. Theoretically, the thermal energy obtained from the combustion of 1 kg of carbide should be sufficient to heat approximately 6 kg of iron from room temperature to a temperature of 1630° C. However, in practice, this high efficiency which is required for an economical use of the carbide has not been achieved. Moreover, due to increased foaming of the slag, there are significant problems in the operation which by far outweigh any advantages.

SUMMARY OF THE INVENTION

We have found a technically simple process for the treatment of iron melts and for increasing the scrap portion in the converter, preferably in the LD-crucible (LD=Linz-Donawitz) which avoids the above noted problems.

This process comprises blowing in oxygen or an oxygen-containing gas with calcium carbide and possibly other oxidizable substances or/and allow constituents or/and slag constituents onto the iron melt.

Surprisingly, it has been found that even finely particulate calcium carbide can be manipulated together with oxygen up to a temperature of about 200° C. without danger, and without the carbide being destroyed by oxidation and, thus, decreasing its effectiveness. As a result, a complete and uniform transformation is ensured.

As a result of the use of pneumatic conveying and the improvement in the introduction of finely ground reaction components into iron melts, it is now possible to blow in finely particulate to granular calcium carbide by itself or together with other components into iron melts. This is accomplished in a controlled manner using oxygen in predetermined time intervals or in certain amounts per time unit either by means of a lance from the top or through the converter bottom through conventional nozzles.

DESCRIPTION OF THE PREFERRED EMBODIMENT

Since the oxygen lances in top-blowing converters are cooled by water, the oxygen, as a rule, has a temperature of about 10° C. up to the discharge opening. The shape of the nozzle produces expansion of the oxygen flow during the discharge from the lance, which results in a further cooling of the oxygen flow. Accordingly, in operation, the gas-solid mixture is not heated to a temperature high enough to cause the reaction between oxygen and calcium carbide to occur. The combustion takes place between the mouth of the lance and the surface of the metal. The ignition takes place as a result of the temperature of the point of impact of the pig iron or steel bath. The calcium carbide forms a calcium oxide which readily reacts and causes an acceleration of the metallurgical reactions (desulfurization, dephosphorization, etc.). This process allows a significant reduction of the addition of lime, so that the time for dissolution of the lime is reduced.

In the bottom-blowing process for the desulfurization and deoxidation of iron melts, it is known to blow in carbide together with deoxidizing agents in an inert carrier gas (German Offenlegungsschrift 26 02 536). In this process, the heat supply cannot be increased and a reactive CaO cannot be obtained in *statu nascendi*, as with the process of the invention.

To achieve a complete transformation with the present invention, it is preferred that an excess of oxygen be used.

The calcium carbide is preferably blown in in the form of finely ground or crushed commercial calcium carbide containing about 75 to 83% $CaC_2$.

The grain sizes of the calcium carbide and any additionally added metals or metal oxides blown-in may vary within wide limits and be in the range of 0.001 to 20 mm. However, a range of 0.01 to about 1 mm is preferred.

In place of the commercial carbide, eutectic carbide, i.e., a carbide with higher portions of calcium oxide, may have advantageous effects. As a result, because of the reduced heating effect, an increased amount of metallurgically active lime (CaO) can be added.

The amount of the calcium carbide to be blown in depends, on the one hand, on the amount of the charged scrap portion or on the temperature of the melt and, on the other hand, the composition of the carbide to be blown in. Generally, 5 to 125 kg, preferably 30 to 60 kg, of calcium carbide are blown in per ton of iron melt to be treated. With these amounts, sufficient control of the temperature of the iron melt becomes possible even with large additions of scrap. Furthermore, by controlling the amount of the calcium carbide added to the oxygen, it is also possible to control the oxygen content of the iron melts. In turn, the oxygen content of the melt can be controlled within narrower limits than in the conventional manner of operation. By the controlled addition of calcium carbide, it is possible to suppress the oxidation of alloy metals, to accurately control the yield of effective alloy elements during tapping, such as, aluminum and silicon, or also to adjust the oxygen in such a way that certain steel qualities, such as, rimmed or semi-rimmed qualities, can be produced during pouring without errors.

Additional oxidizable inorganic compounds may preferably be added to and simultaneously blown and alloyed into the calcium carbide. Preferably, silicon carbide is added in this manner.

In addition to the compounds which merely generate thermal energy, in accordance with the process of the present invention, compounds which result in an alloying effect in the steel bath through reduction processes, particularly metal oxides, can be added to the calcium carbide. In this case, nickel oxide (Ni-sinter), vanadium pentoxide, chromium trioxide and other oxides or ores are preferably used, depending on the desired steel quality.

According to the invention, the metal oxides used for alloying can be introduced into the steel bath together with the oxidizable inorganic compounds and the calcium carbide. However, they can also be merely added into the calcium carbide or by themselves into the oxygen flow.

The amount of such compounds or ores may be up to 50% by weight of the calcium carbide used, and will essentially depend on the steel qualities required or the prevailing economic conditions.

Finally, it is also possible to add metallurgically active slag consitutents to the calcium carbide. Among these are particularly, calcium fluoride, borates, alumina, lime and mixtures thereof.

The formation of a suitable slag is important with respect to keeping the iron content in the slag, i.e., that portion present as iron (II) oxide, as low as possible, since FeO attacks the brick lining of the converter and reduces the iron yield. On the other hand, the nature of the slag must be such that in the region of the jet, an essentially free zone through which the reaction gases can escape can be formed. As a result, the retention of gases in the slag which would lead to foaming is prevented. Foaming does occur when the calcium carbide or silicon carbide is added in lumps or pieces.

It may be advantageous to mix the solid components with the oxygen flow only in the region of the discharge opening of the lance nozzle. In this case, the calcium carbide or the mixture with the other solid additives can be conveyed by means of carbon dioxide or carbon monoxide, and the mixing with the oxygen flow is then performed only in the region of the discharge opening of the lance nozzle.

Depending on the progress of the melting procedure, the refining reaction, or the amount of impurities in the pig iron melt, such as, for example, sulfur, the treatment gas is charged with more or less calcium carbide and, if necessary, slag constituents in the case of stepwise charging. This addition of the calcium carbide can continuously increase or decrease or can be constant over the entire treatment period.

Finally, the amount of the added scrap portion has an influence on the temperature of the pig iron melt. An additional amount of calcium carbide and, possibly, metal compounds, such as, for example, silicon carbide, etc., may have a strong regulating effect. If the temperature of the melt has dropped too low, this temperature can be quickly and safely raised by intermittently adding calcium carbide or mixtures of calcium carbide with other exothermic additives.

The process of the invention can also be used in bottom-blown converters. Since, in the bottom blown converter the calcium carbide introduced and the reaction products generated in the treatment gas flow through the depth of the entire bath, a high transformation is ensured. The decomposition of undesired materials accompanying the steel production takes place quickly to reach values near the reaction equilibrium. The heat transfer from the reaction zone to the melt takes place with an efficiency of almost 100%.

The process according to the invention improves the controllability of the blowing procedure particularly in respect to the heat supply, facilitates the reduction of the addition of lime, avoids the formation of foam, reduces the FeO content of the slag and the oxidation of alloying elements, and increases the durability of the brick lining of the converter. The process can be carried out very simply and does not require any special apparatus.

The process according to the invention shall be further explained with the aid of the following examples.

EXAMPLE 1

The invention was tested in a series of 11 melts. All of the numbers recited in the following are average values for the 11 melts.

(a) Comparative example
Conventional manner of operation:

| | |
|---|---|
| Pig iron | 78.5 t |
| Scrap | 15 t |
| Lime | 4.5 t |
| Yield liquid | 85.5 t |
| Sulfur, final content φ | 0.021% |
| Phosphorus, final content φ | 0.014% |
| Iron yield | 91.5% |

(b) Manner of operation in accordance with the invention

| | |
|---|---|
| Pig iron | 78.5 t |
| Scrap | 31 t |
| Lime | 2.1 t |
| Carbide | 2.8 t |
| Yield liquid, about | 102.5 t |
| Sulfur, final content φ | 0.014% |
| Phosphorus, final content φ | 0.007% |
| Iron yield | 95.5% |

EXAMPLE 2

In a series of four melts, the influence of charging the oxygen flow with calcium carbide based on the iron (II) oxide content in the slag and on the content of dissolved oxygen in the steel were determined.

In a charge of about 100 t of liquid steel, each with content of 0.07% carbon, 0.02% sulfur and 0.015% phosphorus (a) 41 t scrap were added and 4 t calcium carbide were top-blown, (b) 21 t scrap were added and blown with oxygen, without the addition of calcium carbide.

Result:

In the melts which were treated with calcium carbide, the iron (II) oxide content in the slag was 11 to 14% FeO; in the melts treated only with oxygen, the content was 18 to 23% FeO.

The oxygen contents in the steel melts before tapping behaved analogously. In the liquid steel which was treated with calcium carbide, the oxygen content was 400 to 600 ppm, while in the other melts, the oxygen content was 800 to 1200 ppm.

EXAMPLE 3

In a 110 t converter operating according to the LD method, the effects of the manner of operation in accordance with the present invention was examined in a series of ten melts.

On the average, 85 t pig iron with a content of about 3.6% carbon, 0.030% sulfur and 1.6% phosphorus were used, and 28 t scrap were added.

After a conventional blowing procedure (oxygen, charged with 4% calcium oxide) of about 15 minutes, the converter was tilted, the slag partially removed and once again recharged with about 29 t scrap. The amount of lime to be once again added was reduced to about 1%. The lime was replaced by commercial calcium carbide and, on the average, altogether 5 t calcium carbide with a blowing rate of 400 kg/min were blown. After another blowing period of 13 to 16 minutes, the carbon content was in the range of 0.32 to 0.36%; the sulfur content was 0.011%; and the phosphorus content was 0.008%.

Compared to the conventional manner of operation, the charging time was increased by only 3 to 5 minutes. However, the hourly capacity increased from 146 t/h to 170 t/h, which meant an increase of 16.4% with improved final contents of phosphorus and sulfur as compared to the normal manner of operation.

EXAMPLE 4

In four melts according to the LDAC* method with a 100 t tapping weight, the heating effects using the method of the present invention were explained. Using the conventional manner of operation, a temperature of ~1580° C. for steel melt with about 0.35% carbon was determined, which was, on the average, too low by 25° C.

*LDAC: LD-Technology employing CaO powder, carried over via the oxygen flow

In order to correct the temperature, the oxygen flow was charged with commercial calcium carbide immediately following the last temperature measurement.

The flow rate was 40 to 50 kg calcium carbide/min; after 5 minutes, 2.5 to 3 kg calcium carbide per ton of steel has been blown in. During this time period, the temperature of the melt increased, on the average, by 29.5° C. Simultaneously, the iron (II) oxide content of the slag was reduced, on the average, by 4.5% and, thus, the iron yield was increased accordingly.

EXAMPLE 5

In a series of 6 melts with a tapping weight of 110 t produced in accordance with the LD method, the lime addition was lowered from 4.5% to about 1% of the weight of the steel. The oxygen jet was now charged with a mixture of finely particulate calcium carbide, dolomite and fluorspar in the ratio of 100:15:10; the flow rate was 250 kg mixture/min.

As a result, it was possible to increase the addition of scrap from 15 t to 44 t. The extent of desulfurization was increased by this measure from, on the average, 23% to 59%.

What is claimed is:

1. In a process for the treatment of iron melts and for increasing the scrap iron portion in a converter by blowing in an oxygen-containing treatment gas with the addition of calcium carbide, the improvement which comprises blowing in calcium carbide with a gas selected from the group consisting of oxygen and oxygen-containing gases on top or into the iron melt.

2. The process of claim 1, wherein said oxygen-containing gas charged with calcium carbide is blown into the melt through nozzles in the converter bottom.

3. The process of claims 1 or 2 wherein said gas also contains oxidizable substances, alloying constituents or slag constituents.

4. The process of claims 1 or 2, wherein the calcium carbide used is commercial calcium carbide.

5. The process of claims 1 or 2 wherein the calcium carbide used is eutectic calcium carbide.

6. The process of claims 1 or 2, wherein the amount of calcium carbide blown in per ton of the iron melt to be treated is from 5 to 125 kg.

7. The process of claims 1 or 2, wherein the amount of calcium carbide blown in per ton of the iron melt to be treated is from 30 to 60 kg.

8. The process of claims 1 or 2, wherein the amount of oxidizable substances is varied during the treatment procedure within a range of 0.001 to 50% by weight relative to calcium carbide.

9. The process of claims 1 or 2 wherein the grain size of the solid material to be blown in is within the range of 0.001 to 20 mm.

10. The process of claims 1 or 2 wherein the grain size of the solid material to be blown in is within the range of 0.01 to 1.0 mm.

11. The process of claims 1 or 2 wherein the addition of said calcium carbide is carried out in a stepwise manner in dependence on the progress of the refining reaction.

12. The process of claims 1 or 2 wherein the addition of said calcium carbide is carried out intermittently in dependence on the temperature of said melt.

13. The process of claims 1 or 2 is introduced to the melt with a lance and wherein said calcium carbide is conveyed pneumatically to the tip of the lance by means of carbon dioxide or carbon monoxide and is mixed with an oxygen flow at this point.

14. In a process for the treatment of iron melts and for increasing the scrap iron portion in a converter by blowing in an oxygen-containing treatment gas with the addition of calcium carbide, the improvement which comprises controlling the temperature of the iron melt by blowing in calcium carbide with a gas selected from the group consisting of oxygen and oxygen-containing gases on top of or into the iron melt.

* * * * *